US008780742B2

(12) United States Patent
McWilliams et al.

(10) Patent No.: US 8,780,742 B2
(45) Date of Patent: Jul. 15, 2014

(54) REDUCING ENERGY CONSUMPTION IN MOBILE TELECOMMUNICATIONS

(75) Inventors: Brendan McWilliams, Madrid (ES); Francisco Javier Dominguez Romero, Madrid (ES); Yannick Le Pezennec, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 170 days.

(21) Appl. No.: 12/943,257

(22) Filed: Nov. 10, 2010

(65) Prior Publication Data

US 2011/0194429 A1 Aug. 11, 2011

(30) Foreign Application Priority Data

Nov. 11, 2009 (ES) .................................. 200930976

(51) Int. Cl.
*H04W 52/02* (2009.01)
(52) U.S. Cl.
USPC ........... 370/252; 370/311; 370/338; 370/336; 370/328; 455/574; 455/572; 455/561
(58) Field of Classification Search
CPC . H04W 52/02; H04W 88/06; H04W 52/0225; H04W 52/0216; H04W 52/0203; H04L 12/26; Y02B 60/50
USPC ......... 370/252, 229, 311, 335, 389, 338, 336, 370/328; 455/574, 572, 561, 423, 334
See application file for complete search history.

(56) References Cited

U.S. PATENT DOCUMENTS

| | | | |
|---|---|---|---|
| 6,314,090 B1 * | 11/2001 | Nakamura et al. ............ | 370/335 |
| 6,584,330 B1 * | 6/2003 | Ruuska ......................... | 455/574 |
| 7,158,595 B2 * | 1/2007 | Yang et al. .................... | 375/356 |
| 7,548,519 B2 * | 6/2009 | Motegi et al. ................. | 370/318 |
| 8,248,979 B2 * | 8/2012 | Kleindl ......................... | 370/311 |
| 2003/0007470 A1 * | 1/2003 | Grilli et al. ................... | 370/335 |
| 2006/0253735 A1 * | 11/2006 | Kwak et al. .................... | 714/12 |
| 2007/0066273 A1 * | 3/2007 | Laroia et al. ............... | 455/343.2 |
| 2008/0151812 A1 * | 6/2008 | Camp et al. ................... | 370/320 |

OTHER PUBLICATIONS

Anonymous, "Method to increase power efficiency in a mixed GSM/UMTS network", Jul. 1, 2003, vol. 471, No. 88, Research Disclosure, Mason Publications, Hampshire, GB.
Ericsson et al, "Extended cell DTX for enhanced energy-efficient network operation", Nov. 9, 2009, 3GPP Draft; R1-095011 (Energy Efficiency), 3rd Generation Partnership Project (3GPP), Mobile Competence Centre; 650, Route Des Lucioles; F-06921 Sophia-Antipolis Cedex; France.
European Search Report dated Sep. 13, 2012 in corresponding EP 10190315.1.
Anonymous, "Method to increase power efficiency in a mixed GSM/UMTS network", Research Disclosure, Mason Publications, Hampshire, GB, vol. 471, No. 88, Jul. 1, 2003, XP007133045.

\* cited by examiner

*Primary Examiner* — Jamal Javaid
(74) *Attorney, Agent, or Firm* — B. Aaron Schulman, Esq.; Nicholas Trenkle, Esq.; Stites & Harbison, PLLC.

(57) ABSTRACT

Method and network element for reducing energy consumption in WCDMA cells of a mobile network, the method comprising: monitoring traffic conveyed in the traffic channels of a cell; analyzing certain predetermined parameters in the monitored traffic; determining whether said predetermined parameters meet corresponding predetermined conditions; and when said predetermined conditions are met, switching off continuous transmission of common channels and facilitating the intermittent transmission of the common channels during one or more transmission events, thereby causing the cell to enter a cell standby mode.

20 Claims, 3 Drawing Sheets

REDUCING ENERGY CONSUMPTION IN MOBILE TELECOMMUNICATIONS

FIELD OF THE INVENTION

The present invention is comprised within the field of mobile telecommunications, and more specifically in a method for reducing the energy consumption in the cells of a WCDMA mobile network.

BACKGROUND OF THE INVENTION

At present the energy consumed by mobile network operators consists largely in the consumption of energy in the radio network. Attempting to reduce energy consumption from the radio network e.g. increased power efficiency in the operation of 2G and 3G RAN infrastructure—a crucial component part of the system—will lead to significant savings. Drivers are not only to reduce operating costs but also in turn to reduce carbon emissions due to the wasted energy.

In 2G networks, due to the TDMA structure of the GERAN technology it has been possible to find relatively efficient solutions allowing to switch-off TRX's whenever there is no traffic either on a short term basis (switch off in given timeslots) or on a long term basis (full TRX switch-off when no traffic). This is especially efficient because legacy 2G RF hardware is traditionally based on single carrier power amplifier, hence when switching-off a TRX, the power amplifier can be completely switched-off.

In 3G networks, due to the CDMA structure of the UMTS technology even when there is no voice or data traffic to be carried over a given carrier, the common channels are still transmitted continuously which prevents to perform any switch-off of the power amplifier. Only when there is more than one carrier active at the same time it is possible to switch-off the extra carriers (one carrier still being transmitted to keep the network operational and allow waking-up the dormant cells when required). In addition, the common use of multicarrier makes this switch-off of extra carriers still quite inefficient as it is not possible to fully switch-off the power amplifier. Hence the continuous transmission in 3G makes the Node B's consume significant amount of power even when there is no or relatively low traffic. The present invention provides a solution for the commented problem.

It is well-known that abbreviations and acronyms are frequently used in the mobile telephony field. Below is a glossary of acronyms/terms used throughout the present specification:

BCH Broadcast Channel
CDMA Code Division Multiple Access
CN Core Network
CPICH Common Pilot Channel
DCH Dedicated Channel
DL Downlink
DRX Discontinuous Reception
FACH Forward Access Channel
GERAN GSM EDGE Radio Access Network
KA Keep-Alive
P-CCPCH Primary Common Control Physical Channel
P-CPICH Primary Common Pilot Channel
PCH Paging Channel
RACH Random Access Channel
RAN Radio Access Network
RNC Radio Network Controller
RSCP Received Signal Code Power
SCH Synchronization Channel
SIB System Information Block
TRX Transceiver
UE User Equipment
UL Uplink
UMTS Universal Mobile Telecommunications System
UTRAN UMTS Terrestrial Radio Access Network
WCDMA Wideband Code Division Multiple Access

DESCRIPTION OF THE INVENTION

The invention relates to a method for reducing energy consumption in WCDMA cells of a mobile network according to claim 1, and to a network element according to claim 11. Preferred embodiments are defined in the dependent claims.

In accordance with one aspect of the invention, there is provided a method for reducing energy consumption in WCDMA cells of a mobile network, the method comprising:
  monitoring traffic conveyed in the traffic channels of a cell;
  analyzing certain predetermined parameters in the monitored traffic;
  determining whether said predetermined parameters meet corresponding predetermined conditions; and
  when said predetermined conditions are met, switching off continuous transmission of common channels and facilitating the intermittent transmission of the common channels during one or more transmission events, thereby causing the cell to enter a cell standby mode.

In a preferred embodiment, the intermittent transmission is periodic having a characteristic period $P_{KA}$ and the (or each) transmission event has a characteristic duration $T_{KA}$, said characteristic duration being substantially shorter than the characteristic period $P_{KA}$.

The predetermined conditions can be met, for instance, when no data is carried in the traffic channels of the cell during a determined trigger time $T_{TR}$.

The predetermined conditions can be analyzed by the RNC of the Node B in charge of the cell, the predetermined parameters being parameters of the traffic monitored in the cells of that RNC. The predetermined parameters can include at least one of the following: connection setup requests, release requests, UL and DL data traffic volume.

The method can further comprise whenever a paging request is received by a cell in standby mode, resuming the normal mode of operation of said cell.

In a preferred embodiment the method comprises whenever a valid connection request is received by a cell in standby mode, resuming the normal mode of operation of said cell.

The method may further comprise resuming the normal mode of operation of said target cell whenever a mobile terminal with a Cell_DCH connection is performing a handover to a neighbouring target cell in standby mode.

Alternatively or additionally, the method may further comprise resuming the normal mode of operation of said cell whenever a mobile terminal with a Cell_DCH connection signals a measurement report of a cell in stand-by mode.

When transmitting the common channels during a transmission time $T_{KA}$, the CPICH and SCH transmissions are preferably started before the transmission of BCH data on the P-CCPCH.

The method can also comprise informing the mobile terminals in idle mode camped in a cell as well as the mobile terminals in idle or connected mode located in neighbouring cells that the cell has standby mode capabilities enabled.

In the present method, the UE can discover that a cell is currently operating in standby mode with or without explicit signalling.

In accordance with a further aspect of the invention there is provided a network element for reducing energy consumption in WCDMA cells of a mobile network. The network element comprises:
- a monitoring controller configured for monitoring traffic conveyed in the traffic channels of a cell;
- a control unit operable to:
  - analyze certain predetermined parameters in the monitored traffic;
  - determine whether said predetermined parameters meet corresponding predetermined conditions;
  - when said predetermined conditions are met, switch off continuous transmission of common channels and facilitate the intermittent transmission of the common channels during one or more transmission events, thereby causing the cell to enter a cell standby mode.

The control unit can be further configured for:
- whenever a paging request is received by a cell in standby mode, resuming the normal mode of operation of said cell; and/or
- whenever a valid connection request is received by a cell in standby mode, resuming the normal mode of operation of said Node B; and/or
- whenever a mobile terminal with a Cell_DCH connection is performing a handover to a neighbouring target cell in standby mode, resuming the normal mode of operation of said target cell; and/or
- when transmitting the common channels of a Node B in standby mode during a transmission time $T_{KA}$, start the CPICH transmission before the transmission of BCH data on the P-CCPCH.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION

Figure 1:
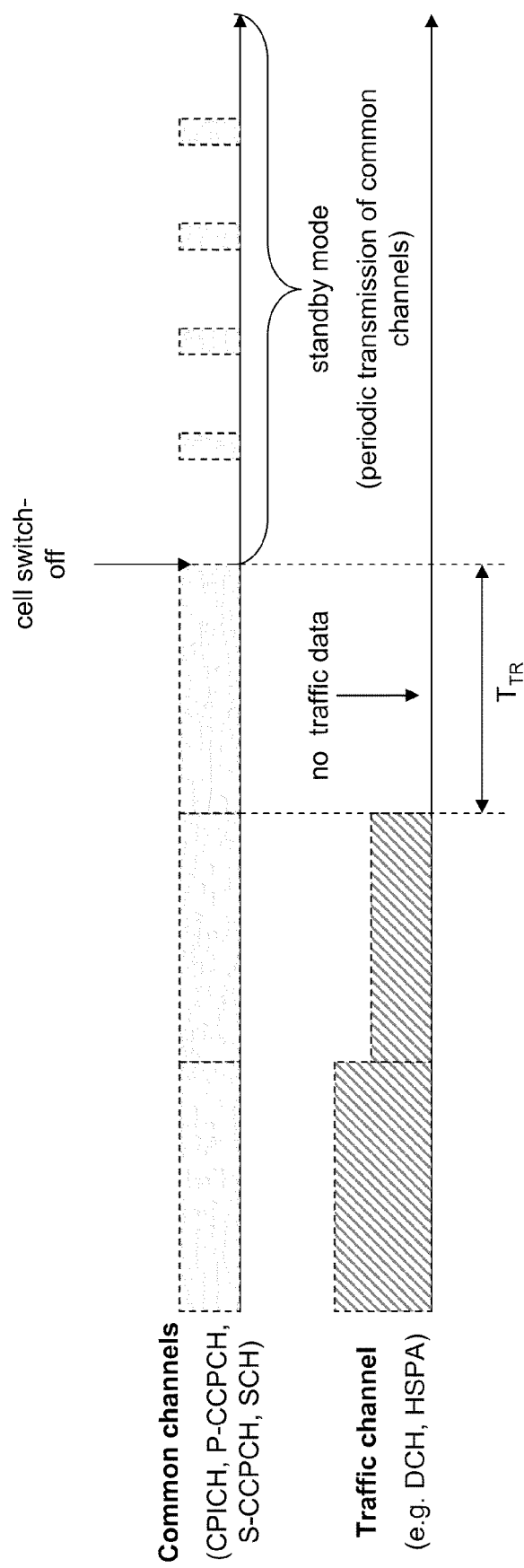
FIG. 1 shows the cell switch-off functionality of the present invention.

The solution above allows significant reductions in power consumption at Node B when there is no traffic (e.g. at night in a cell covering a rural area). It is based on a standby state consisting of a duty cycle allowing periodical pauses in transmission and reception at the Node B (allowing full switch-off at the power amplifier). This is achieved by switching off common channels periodically, whenever the cell is not carrying any traffic. An overview of one embodiment of the solution is depicted in FIG. 1, in which when no voice or data is sent or received over the traffic channels during a determined trigger time $T_{TR}$, the cell switch-off is triggered. Then, the cell enters standby mode, in which the common channels are only transmitted periodically.

In order to perform this solution without affecting the network operation, the UE in the cell and neighbouring cells need to be informed about the switch-off pattern via signalling. One solution to allow performing the standby mode is presented in FIGS. 2 and 3, in which a common channel transmission pattern is created and characterised by:

- A keep-alive period $P_{KA}$ which represents the duty cycle of the common channels (i.e. how often the common channels are transmitted for the UE to perform measurements and read BCH including SIB system information, PCH or FACH information).
- A keep-alive transmission time $T_{KA}$ which represents the time over which the common channels are transmitted without interruption (number of consecutive frames). This time $T_{KA}$ should be sufficient to read SIB information on BCH (e.g. 1280 ms or more) and perform CPICH measurements.
- A starting time for the standby mode which corresponds to the first idle frame (frame when the common channel transmission is stopped).

The keep-alive transmission time $T_{KA}$ should allow periodic transmissions for small bursty packet connections, for example when there is a limited packet traffic which can be handled via common channels such as Enhanced cell-FACH and RACH.

Figure 2:
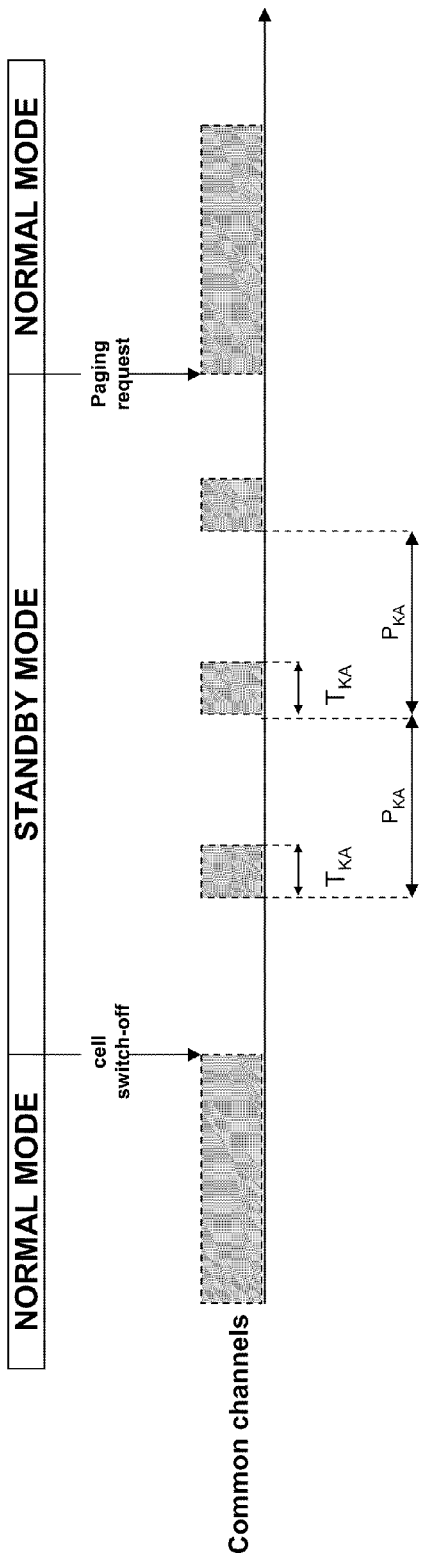
FIG. 2 shows common channel transmissions during normal mode and standby mode.
Figure 3:
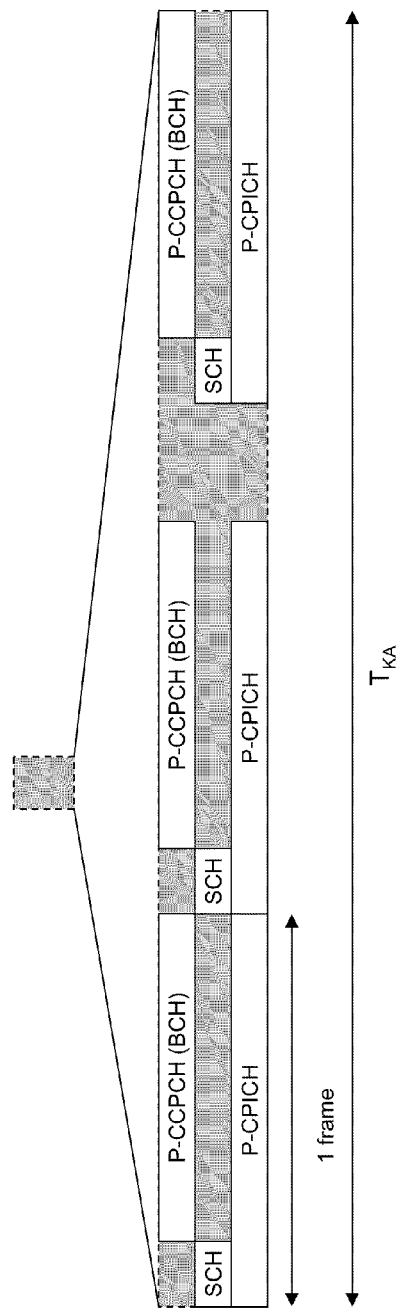
FIG. 3 shows a common channel transmission pattern in standby mode.

The standby mode procedure can be as follows:
- The RNC monitors the traffic in the different cells based on different metrics such as connection setup/release requests, UL and DL data traffic volume and decides how and when a cell can be entered into standby mode.
- Whenever a valid CN or UTRAN originated paging request appears, the standby mode is immediately aborted and the normal mode of operation resumes (as shown in FIG. 2). In order to reduce false alarms, paging in cells in standby mode should be performed waiting for 1 or more DRX cycles (allowing UE to perform cell update if present in a cell operating in normal mode).
- In addition, UE shall be able to perform a connection request on RACH whilst the Node B is in standby mode during the keep-alive period (which is known by the UE). Two approaches could be taken: 1) allowing RACH transmission only during the keep-alive transmission periods $T_{KA}$ or 2) allowing RACH transmission during the full keep-alive period $P_{KA}$ (which would not allow full switch-off the receiver but will ensure fast call setup). Similarly to the paging case, when a valid connection request is received the cell resumes the normal mode of operation. The connection request on RACH could be transmitted at maximum power in case it has not been able to measure adequately the CPICH RSCP over the different keep-alive periods (that is, the absolute power level of the CPICH as received by the UE) to calculate the power. But this is not a problem as there is no traffic in the cell, so no traffic is impacted due to the high RACH power. This is particularly relevant when one chooses to use long keep-alive periods which could make the opportunities to measure CPICH too infrequent to perform an adequate averaging.
- The use of the cell standby mode has an impact on the mobility procedure: UE camped or operating in 2G or in a 3G neighbouring cell are aware that a given 3G cell can enter standby mode (cell with "standby mode" capabilities). The use of the new standby mode requires a modification of the UE behaviour to take this new cell state into account. The UE can either be informed that the cell operates in standby mode or that the cell has "standby mode" capabilities enabled. This information can be signalled to the UE when in idle mode using an information element on the BCH associated to the camped-in cell and every neighbouring cell or be informed directly of the cell status when in connected mode. In order to avoid complex signalling procedures to maintain the instantaneous status of each of the cells in the vicinity of the UE, it is important that the UE has the capability to discover the instantaneous status of a cell flagged as "standby mode" capable. For the standby mode capable cells the UE is made aware of the settings of the keep-alive period $P_{KA}$ and associated common channel transmission as they are indicated in the BCH signalling information so that it can identify the status of the monitored cell. That is, the UE can detect a cell as "standby-mode capable" using signalling channel (BCH), so that the UE can detect (by periodically listening to the common channels) that the cell is currently in standby mode or not.

Figure 4:
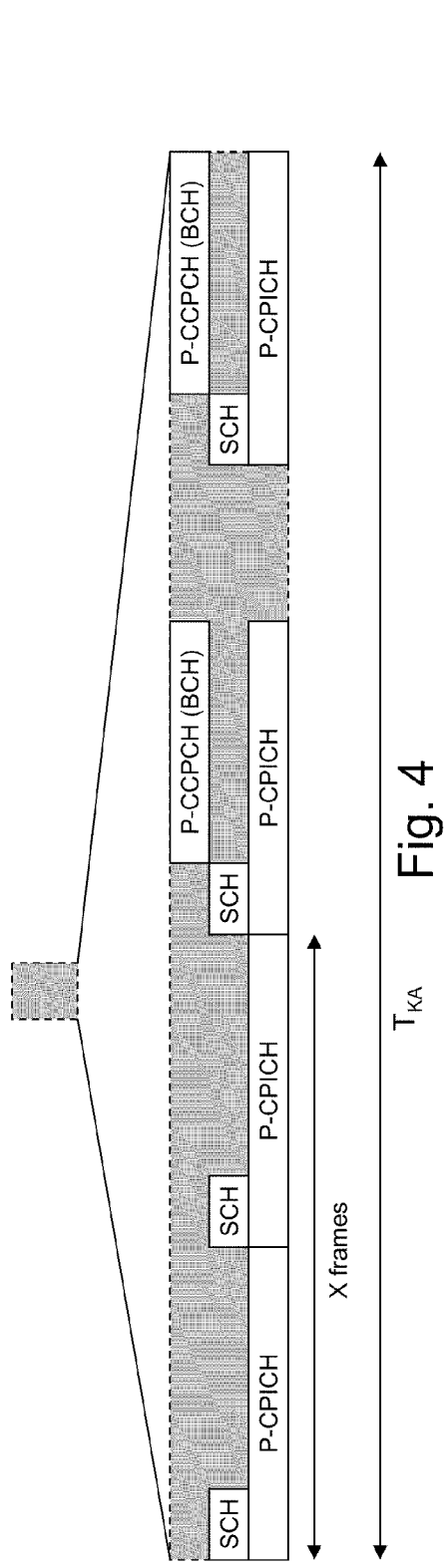
FIG. 4 shows a common channel pattern used at the start of a keep-alive transmission or when resuming normal mode.

This is important to avoid affecting CPICH RSCP and CPICH Ec/No (CPICH Ec/No is the ratio of the received energy per PN chip for the CPICH to the total received power spectral density at the UE antenna connector) measurements performed by the UE in the cell as well as UE in neighbouring cells. This is important also to make sure that the UE can fully read the BCH information during the active periods of the P-CCPCH. For the UE to be able to acquire correctly the BCH information the CPICH transmission could be started (during a certain number X of frames) before the transmission of BCH data on the P-CCPCH as depicted in FIG. 4. This might be achieved for example by not transmitting any data on the first frames during the common channel transmission in standby mode. This is because the UE has to be fully synchronised to the cell in order to receive correctly all the signalling data. And to be fully synchronised it is necessary to listen to the CPICH and the SCH (Synchronisation channels). This acquisition mode applies to both the keep-alive period but also when the cell resumes normal mode operation (with the possibility to set these independently).

The keep-alive period $P_{KA}$ will have a pre-defined maximum duration, in such a way that a UE in cell selection procedure will wait to know if the monitored cell is in stand-by mode. For the UE in idle mode when monitoring cells in standby mode, one (or more) keep-alive transmission period $T_{KA}$ might be required to perform sufficient averaging of the CPICH measurements, this is dependent on how is set the duration of the keep-alive period $P_{KA}$, as well as the duration of the keep-alive transmission $T_{KA}$.

For those UE that have a Cell_DCH connection in a cell targeting to perform a handover to a cell in standby mode, the standby mode has to be switched-off in this target cell in order to have the cell ready to handle the connection to be established. It can be done, for example, as soon as the RNC is signalled a measurement report triggering a handover to the cell in stand-by mode in order to do the handover from the neighbouring cell with no interruption of service. The settings of the keep-alive period should be such that it allows connected UE to identify correctly any potential cell in standby mode.

Figure 5:
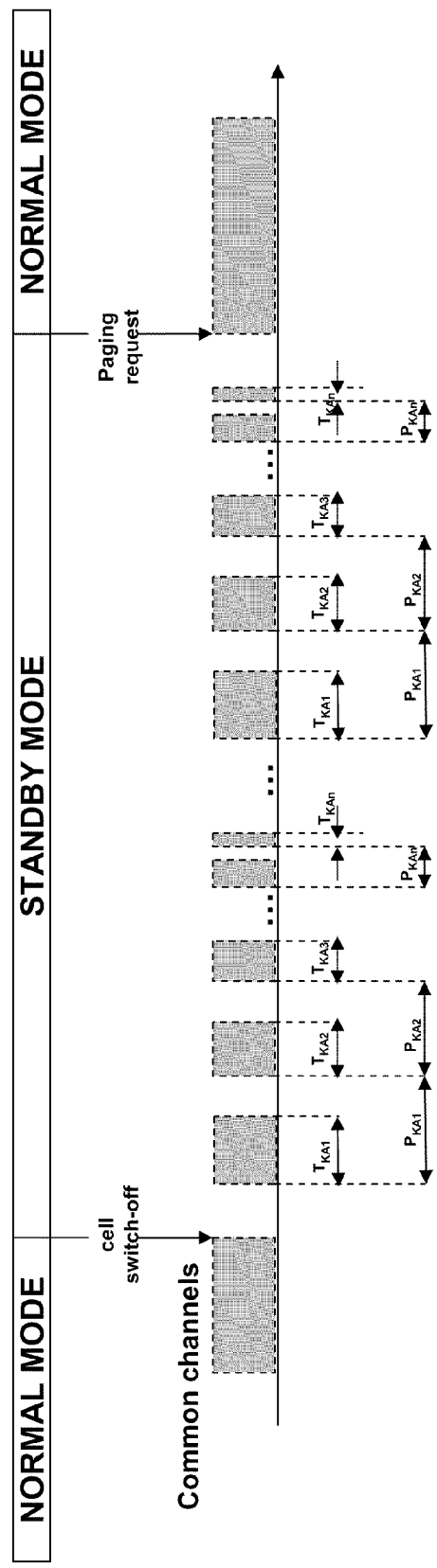
FIG. 5 shows common channel transmissions during normal mode and standby mode according to another preferred embodiment of the present invention.

In FIG. 5 it is represented common channel transmissions during normal mode and standby mode according to another preferred embodiment of the present invention, which it turns to be a generalization of the solution implemented in FIG. 2. In the embodiment shown in FIG. 5 the pattern ($TKA_1$, $PKA_1$), ($TKA_2$, $PKA_2$), . . . ($TKA_3$, $PKA_3$) is periodically repeated until the normal mode is resumed.

The invention claimed is:

1. A method for reducing energy consumption in Wideband Code Division Multiple Access (WCDMA) cells of a mobile network, the method including:

monitoring, using a Radio Network Controller (RNC), traffic conveyed in traffic channels of a WCDMA cell of the mobile network;

analyzing certain predetermined parameters in the monitored traffic;

determining whether said predetermined parameters meet corresponding predetermined conditions; and when said predetermined conditions are met, switching off continuous transmission of common channel control signaling at a normal rate and causing the WCDMA cell to enter a cell standby mode comprising one or more intermittent transmission events during each of which intermittent transmission of the common channel control signaling is facilitated in which the common channel control signaling is transmitted at the normal rate in a first plurality of consecutive frames then not transmitted in a subsequent second plurality of consecutive frames, whereby each of one or more mobile terminals in idle mode camped in the WCDMA cell and each of one or more mobile terminals in idle mode or connected mode in neighboring cells to the WCDMA cell is enabled to discover that the WCDMA cell has cell standby mode capabilities enabled or is in the cell standby mode.

2. The method according to claim 1, wherein the intermittent transmission is periodic having a characteristic period $P_{KA}$ with a duration corresponding to a number of frames in the first and second pluralities of consecutive frames.

3. The method according to claim 1, wherein the one or more intermittent transmission events includes a plurality of transmission events, wherein each transmission event has a characteristic duration $T_{KA}$ during which the common channel control signaling is transmitted at the normal rate, and wherein said characteristic duration of each transmission event is less than a duration of a characteristic period $P_{KA}$ for the transmission events.

4. The method according to claim 1, wherein the predetermined conditions are met when no data is carried in the traffic channels of the WCDMA cell during a determined trigger time $T_{TR}$.

5. The method according to claim 1, wherein the predetermined conditions are analyzed by the RNC of a Node B in charge of the WCDMA cell, and wherein the predetermined parameters are parameters of traffic monitored in cells of that RNC.

6. The method according to claim 5, wherein the predetermined parameters include at least one of the following:
connection setup requests;
release requests; and
Uplink (UL) and Downlink (DL) data traffic volume.

7. The method according to claim 1, further comprising whenever a paging request is received by the WCDMA cell in the standby mode, resuming a normal mode of operation of said WCDMA cell.

8. The method according to claim 1, further comprising whenever a valid connection request is received by the WCDMA cell in the standby mode, resuming a normal mode of operation of said WCDMA cell.

9. The method according to claim 1, further comprising whenever a mobile terminal with a Cell Dedicated Channel (Cell_DCH) connection is performing a handover to a neighbouring target WCDMA cell in the standby mode, resuming a normal mode of operation of said target WCDMA cell.

10. The method according to claim 1, further comprising whenever a mobile terminal with a Cell Dedicated Channel (Cell_DCH) connection signals a measurement report of the WCDMA cell in the standby mode, resuming a normal mode of operation of said WCDMA cell.

11. The method according to claim 1, wherein when transmitting the common channel control signaling during a transmission time $T_{KA}$, Common Pilot Channel (CPICH) and Synchronization Channel (SCH) transmissions are started before transmission of Broadcast Channel (BCH) data on Primary Common Control Physical Channel (P-CCPCH).

12. The method according to claim 1, further comprising informing each of the one or more mobile terminals in idle mode camped in the WCDMA cell and each of the one or more mobile terminals in idle or connected mode located in the neighboring cells to the WCDMA cell that the WCDMA cell has cell standby mode capabilities enabled.

13. A network element for reducing energy consumption in Wideband Code Division Multiple Access (WCDMA) cells of a mobile network, the network element including:
a Radio Network Controller (RNC) configured for monitoring traffic conveyed in traffic channels of a WCDMA cell of the mobile network belonging to a Node B connected to the RNC, the RNC being operable to:
analyze certain predetermined parameters in the monitored traffic;
determine whether said predetermined parameters meet corresponding predetermined conditions;
when said predetermined conditions are met, directing the Node B to switch off continuous transmission of common channel control signaling at a normal rate and cause the WCDMA cell to enter a cell standby mode comprising intermittent transmission of the common channel control signaling by the Node B in which the common channel control signaling is transmitted at the normal rate in a first plurality of consecutive frames then not transmitted in a subsequent second plurality of consecutive frames that is facilitated during one or more transmission events,
wherein each of one or more mobile terminals in idle mode camped in the WCDMA cell and each of one or more mobile terminals in idle mode or connected mode in neighboring cells to the WCDMA cell is enabled to discover that the WCDMA cell has cell standby mode capabilities enabled or is in the cell standby mode.

14. The network element according to claim 13, wherein the predetermined conditions are met when no data is carried in the traffic channels of the WCDMA cell during a determined trigger time $T_{TR}$.

15. The network element according to claim 13, wherein the RNC is further configured to, whenever a paging request is received by the WCDMA cell in the standby mode, direct that a normal mode of operation of said WCDMA cell be resumed.

16. The method of claim 2, wherein each $P_{KA}$ comprises a transmission period and a non-transmission period.

17. The method of claim 16, wherein the standby mode has at least two $P_{KA}$ periods.

18. The method of claim 1, wherein the intermittent transmission comprises a transmission period and a non-transmission period.

19. The method of claim 18, wherein the standby mode has at least two intermittent transmissions.

20. A system for reducing energy consumption in Wideband Code Division Multiple Access (WCDMA) cells of a mobile network, the system comprising:
a network element including a Radio Network Controller (RNC) configured to monitor traffic conveyed in traffic channels of a WCDMA cell of the mobile network belonging to a Node B connected to the RNC, the RNC being operable to:
analyze certain predetermined parameters in the monitored traffic,
determine whether said predetermined parameters meet corresponding predetermined conditions, and
when said predetermined conditions are met, directing the Node B to switch off continuous transmission of common channel control signaling at a normal rate and cause the WCDMA cell to enter a cell standby mode comprising intermittent transmission of the common channel control signaling by the Node B in which the common channel control signaling is transmitted at the normal rate in a first plurality of consecutive frames then not transmitted in a subsequent second plurality of consecutive frames that is facilitated during one or more transmission events; and
a plurality of mobile terminals including one or more mobile terminals in idle mode camped in the WCDMA cell and one or more mobile terminals in idle or connected mode located in neighboring cells to the WCDMA cell,
wherein each of the plurality of mobile terminals is configured to discover whether the WCDMA cell has cell standby mode capabilities enabled or is in the cell standby mode.

* * * * *